July 19, 1949.   A. A. BURCKLE ET AL   2,476,480
HOSE AND TUBE FITTING
Filed Nov. 30, 1945
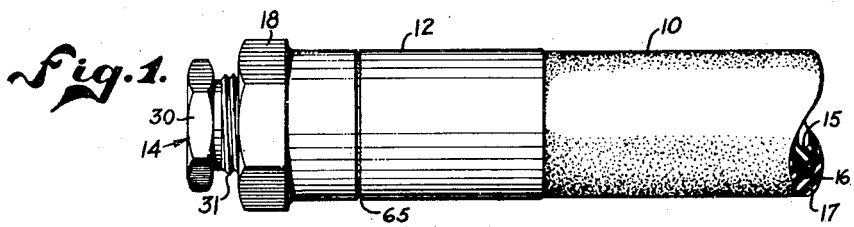
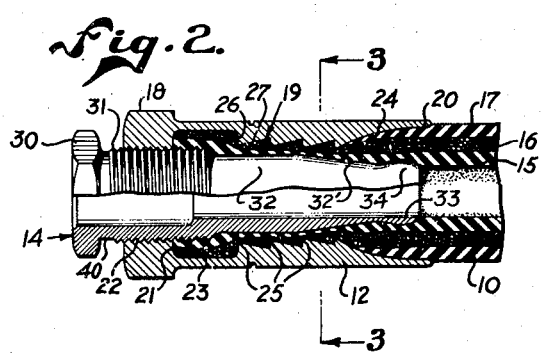
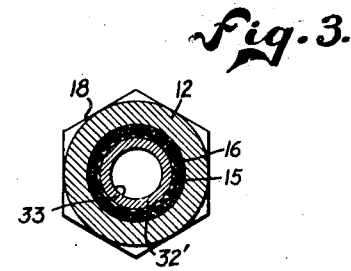
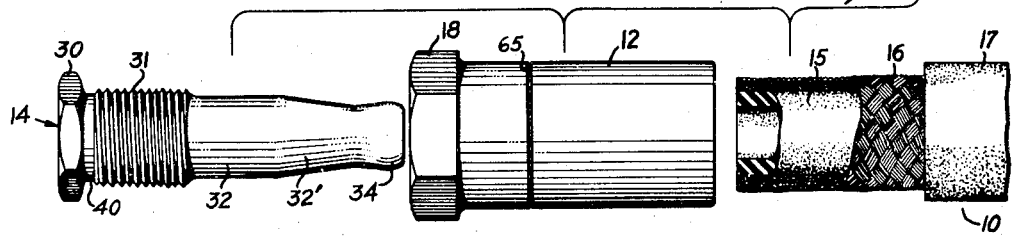
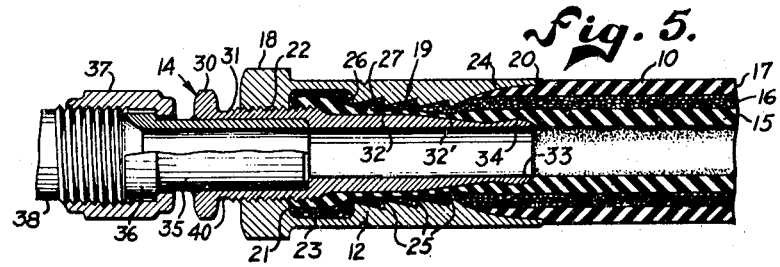
ARTHUR A. BURCKLE.
STEWART C. CHRISTMAN.
INVENTORS.
BY
ATTORNEY.

Patented July 19, 1949

2,476,480

UNITED STATES PATENT OFFICE 2,476,480

HOSE AND TUBE FITTING

Arthur A. Burckle, Burbank, and Stewart C. Christman, Woodland Hills, Calif., assignors, by mesne assignments, to Aeroquip Corporation, Jackson, Mich., a corporation of Michigan Application November 30, 1945, Serial No. 631,928

1 Claim. (Cl. 285—86)

The invention relates to fittings capable of making a successful connection with reinforced hose of a variety of styles.

Although a great many types of fittings have been devised for the purpose of making a tight joint with tubing and with reinforced and other hose of rubber-like material comprising various types of conduit for liquids and gases, difficulty has been experienced in providing fitting members sufficiently versatile so that they may be made to work equally well with the commercial run of products of all manufacturers. It is quite commonly appreciated, for example, that relatively wide tolerances are permitted in both the inside diameter and the outside diameter of commercial reinforced rubber hose. Because of the character of the rubber-like material of which the hose is made, it is not economically possible to hold the product to close tolerances. Furthermore, reinforced flexible hose made by one manufacturer is apt to experience a variation in size from the same hose manufactured by another manufacturer.

As a matter of practice in order to accommodate their devices to all makes of commercial hose of a given size, fitting and coupling manufacturers have been forced in some instances to manufacture several fittings of different dimensions for a specified size to fit hose presumably of the same size produced by different manufacturing concerns. This has been necessary to make certain of having available a fitting capable of making a tight joint with undersized or oversized hose or tubing. The unrealized aim of manufacturers has been to devise a fitting which can be stocked in standard sizes only and which is capable of successful use with both undersized and oversized hose.

It is therefore among the objects of the invention to provide a new and improved fitting or coupling which can be successfully used to make a tight joint with reinforced hose and tubing which may vary considerably from a nominally standard outside and inside diameter.

Another object of the invention is to provide a new and improved fitting or coupling for conduit comprising reinforced hose and tubing wherein a tight grip is had upon the wall of the conduit but in which the grip is spread sufficiently so that excessive pinching of the conduit over a narrow area is avoided.

Still another object of the invention is to provide a fitting or coupling for conduit comprising tubing and hose which can be readily made up and unmade in the field and which makes provision for reception of the material of the conduit which may be displaced from its original position by the pressure used in making up the joint.

A further object is to provide a new and improved fitting for reinforced hose and tubing wherein provision is made for reception of the frayed end of freshly cut hose or tubing and which after being completely assembled preserves substantially the full inside diameter of the tubing through the fitting joint. Included therefore is the provision of a joint so constructed that, should a leak develop for any reason during use, the fitting can be further tightened to make the joint leak proof without it being necessary to unmake or loosen the joint or to make any other change in the fitting connection, resort being had only to the customary styles of wrenches or other pipe tightening devices.

With these and other objects in view, the invention consists in the construction, arrangement and combination of the various parts of the device whereby the objects contemplated are attained, as hereinafter more fully set forth, pointed out in the claim and illustrated in the accompanying drawings, in which:

Figure 1 is a side elevational view of a made up fitting joint.

Figure 2 is a longitudinal sectional view of the joint shown in Figure 1.

Figure 3 is a cross-sectional view taken on the line 3—3 of Figure 2.

Figure 4 is an exploded view of the parts of the fitting and reinforced tubing prior to being made up into a joint, and Figure 5 shows a joint similar to that illustrated in Figures 1 and 2 with provision being made for a special type of attachment.

The fitting herein described is what is commonly known as a detachable fitting sometimes designated for specific purposes as a coupling. Detachable and reusable fittings and couplings are so constructed that they can be applied to a length of hose in the field by the use of ordinary tools, rather than being the type of fitting necessitating the use of bench tools or dies specially constructed for making up the joint. Detachable fittings are widely used because of the fact that they can be assembled in the field wherever it is necessary to connect a hose. When installations of this kind are made, it is first necessary to cut off a hose end to the proper length, then apply the coupling parts to the hose and tighten them to seal the joint, after which the fitting is ready for attachment to a machine, pump, engine, valve or even to another length of similar hose.

In an embodiment choosen to illustrate the invention, a reinforced flexible hose 10 is shown attached to a fitting comprising a body 12 and a nipple 14.

The particular conduit selected for the purpose of illustration is a flexible hose or tubing having an interior rubber-like liner 15, a braided wire reinforcing core 16 and an exterior rubber-like layer 17.

The body 12, which may be designated as a socket, is provided with a hexagonal end 18 to accommodate a wrench and a smooth walled substantially cylindrical body portion. Within the body is an interior chamber 19 having an open end 20 and a closed end 21 in which is a threaded aperture 22. The open end 20, it will be noted, forms a relatively thin feather edge.

Adjacent the closed end is an outwardly directed annular recess 23 which is adapted to receive the fresh cut end of the hose or tubing.

Adjacent the open end the chamber is belled or flared outwardly at 24 in order to accommodate the material comprising the flexible tubing when the tubing is deformed as the joint is made up and portions of the tubing material are displaced. Between the annular recessed portion and the flared portion is a series of annular, spced ridges 25, each of which is provided with a flat face or shoulder 26 on the side facing inwardly and a gradually sloping portion 27 on the side facing outwardly. The diameter of the peak of the innermost ridge is the largest, and the diameters of the peaks of the succeeding ridges are progressively smaller. It has been found in practice that the variation in diameters of the ridges makes a satisfactory fitting when a line drawn through the peaks of the ridges forms an angle of approximately 3° with the axis of the coupling.

In order to hold the tubing in the coupling, the nipple 14 is provided and comprises a hexagonal outer wrench engaging portion 30, an adjacent straight threaded portion 31, and an inner smooth walled portion 32. A central aperture or passage 33 through the nipple is approximately the same diameter as the inside diameter of the flexible hose. The threaded portion 31 is shown as being longer than the threaded aperture at the end of the socket and is adapted to threadedly engage therein.

In the embodiment illustrated the smooth wall portion is cylindrical throughout a portion of its length, and adjacent thereto is a gradually tapered conical portion 32', the conical portion terminating in a bead or knob 34, the inside end of which is gradually tapered in a direction opposite to that of the conical portion. A rounded outer edge may be provided on the knob to facilitate insertion into the end of a hose.

Various types of fittings and connections may be attached to the nipple, and for the purpose of illustration a swivel joint is illustrated in Figure 5. In this example a plug 35 is provided which may, if desired, be made of a metal different from that of the nipple. Use of the same metal, however, is found advantageous in inhibiting electrolytic action between the parts. To provide a tight joint between the plug and the nipple the plug may be braized in place as indicated. In the illustrated joint the plug terminates in a shoulder 36 which is adapted to make a swivel joint with a nut 37 to which may be attached a threaded flared fitting 38. Other types of fittings may be used for various other purposes.

When joining the hose or tubing to the fitting best results are found to be accomplished when the outer layer of the reinforced hose is skinned back for a substantial distance, less than the depth of the chamber in the socket, leaving the braided metal reinforcing exposed. The skinned back end is then pushed into the chamber until the cut end of the hose abuts the inside end of the chamber. During this portion of the operation, action of the ridges 25 may tend to press the inner lining of the hose inwardly to a diameter slightly smaller than the normal inside diameter. When the hose has been inserted to its full depth, a portion of the outside layer will lie within the outwardly belled portion of the chamber.

While the hose is in place the nipple 14 is inserted into the socket and the interior of the hose and threaded inwardly. As the conical inside portion of the nipple progresses inwardly within the chamber and within the hose it will tend to press the inner lining together with the braided metal reinforcing of the hose outwardly so that the metal reinforcing engages the ridges 25. Where the pressure is sufficiently great to produce some flow of the material comprising the inner lining, excess material will be received partly within the annular recess 23 and partly within the recess formed at the junction of the conical portion of the nipple and the knob at the end. In assembled position the knob will be located within the outwardly belled portion of the chamber.

The nipple and chamber are designed with such relationship to each other that for hose of average inside and outside diameter the fitting will be made up tight when the threaded portion of the nipple is only partially threaded through the aperture at the inside end of the chamber. By making this provision some take-up is provided so that the fitting may be tightened still further in case the joint becomes leaky. Moreover, by providing a recess 40 at the base of the threaded portion smaller in diameter than the root diameter of the threads, take-up is provided sufficient to permit the hexagonal outer end of the nipple to be drawn tight against the end of the body if need be.

Regardless of how much the joint may be taken up, flow induced in the rubber layers of the hose is accommodated, at the outer end by the space between the outwardly belled portion of the chamber and the knob, and at the inner end by the recess 23. Good practice has taught that the taper of the conical portion may be at about 7° with respect to the axis of the coupling as compared with the 3° pitch of the tips of the ridges. This relationship it will be appreciated may be varied to some extent while still providing a coupling capable of making a tight leakproof joint under relatively high pressures in all circumstances. On occasions the lines defining the conical portion and that joining the tips of the ridges may be somewhat arcuate in form and still comprise an effective connection.

To further insure the success of each joint and to increase the speed and convenience in the making up of every joint the body 12 may have a marker applied thereto such as a printed line, a bead or a groove 65 as shown in the drawings. The location of the mark is made such that the distance from the small end of the body to the mark is the same as the length of the exterior layer 17 which is to be skinned from the hose 10. The amount of reinforcing core 16 which is bared will be of the same length. When the board end of hose is inserted to its full depth, there will be sufficient exposed metal core to make a firm joint and a sufficient amount of the exterior layer 17 of rubber received within the belled end 24 to provide a continuous smooth finish on the exterior.

In providing a coupling of the type herein described, parts may be quickly and efficiently machined by ordinary screw machine operation and may be interchangeable. Parts may be standardized so that a coupling for a specific designated size will fit tubing and hose varying widely in nominal inside and outside diameters, thus reducing the required inventory of sizes to satisfy a wide variety of circumstances. The coupling can be quickly made up in the field, taken apart, remade and then tightened whenever it may be necessary by the use of ordinary mechanic's tools. Hard-walled as well as soft-walled hose and tubing may be connected with equal effectiveness, disconnected and reconnected again by adapting the dimensions of the interior fitting parts to the particular character and thickness of the hose or tubing wall.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent structures.

Having described the invention, what is claimed as new and desired to be secured by Letters Patent is:

In a fitting for reinforced hose having exterior and interior layers of impervious resilient material separated by a layer of reinforcing material bared for a predetermined distance from the end to be coupled, said fitting comprising a socket of permanently fixed size having a chamber open at one end and the other end of said chamber comprising a wall having a threaded aperture therethrough, means providing a seal between the fitting and the hose comprising a plurality of axially spaced inwardly facing ridges on the chamber wall of progressively decreasing diameters, and a nipple comprising a threaded base engageable with said threaded aperture, a cylindrical portion extending beyond said threaded base and merging into a gradually tapered smooth-walled portion adjoining the cylindrical portion and forming an outwardly diverging acute angle with a line through the ridges, said nipple having an assembled position within the socket member spaced from the ridges a distance less than the initial thickness of the bared portion of the hose.

ARTHUR A. BURCKLE.
STEWART C. CHRISTMAN.

REFERENCES CITED

The following references are of record in the file of this patent:

UNITED STATES PATENTS

| Number | Name | Date |
|---|---|---|
| 1,684,713 | Norgren | Sept. 18, 1928 |
| 1,849,076 | Dick | Mar. 15, 1932 |
| 1,977,219 | Williams | Oct. 16, 1934 |
| 2,029,846 | Henke | Feb. 4, 1936 |
| 2,266,211 | Kaiser | Dec. 16, 1941 |
| 2,278,239 | Butler | Mar. 31, 1942 |
| 2,288,684 | Couty | July 7, 1942 |